C. D. MILLER.
WHEEL.
APPLICATION FILED FEB. 2, 1914.
1,145,842.
Patented July 6, 1915.
2 SHEETS—SHEET 1.
Fig. 1.
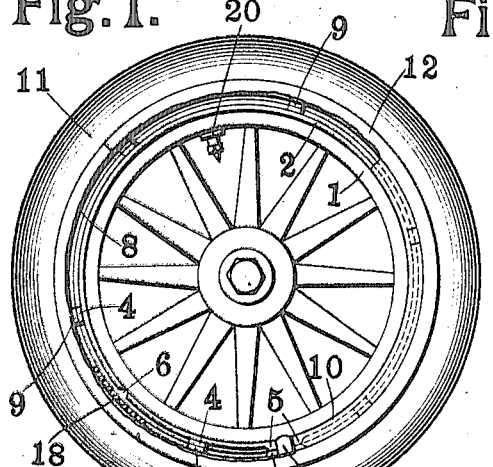
Fig. 2.
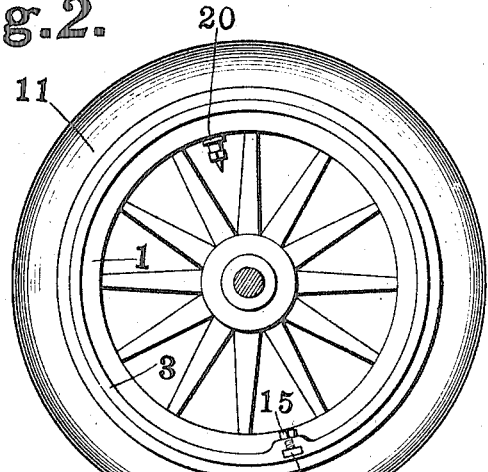
Fig. 3.
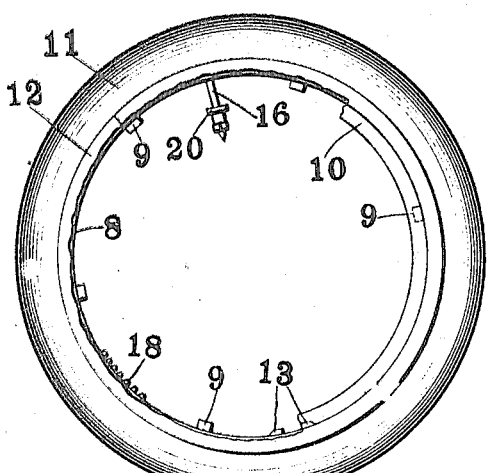
Fig. 4.
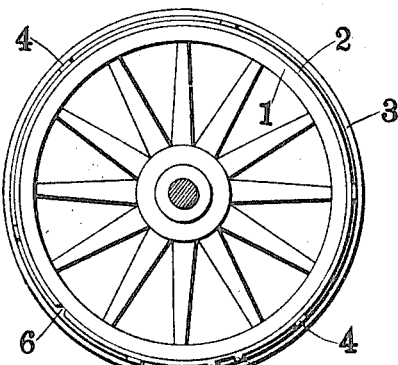
Fig. 10.
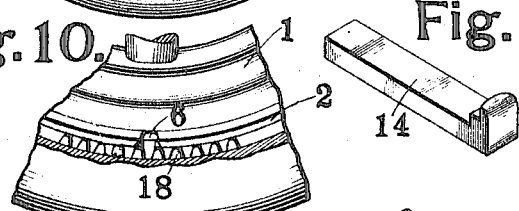
Fig. 12.
Fig. 13.
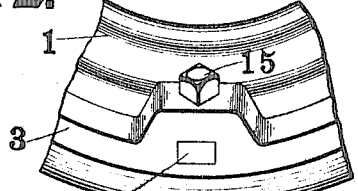
WITNESSES:
Chas. A. Becker
G. M. Rhore
Fig. 11.
INVENTOR
Charles D. Miller,
BY
E. E. Huffman
ATTORNEY

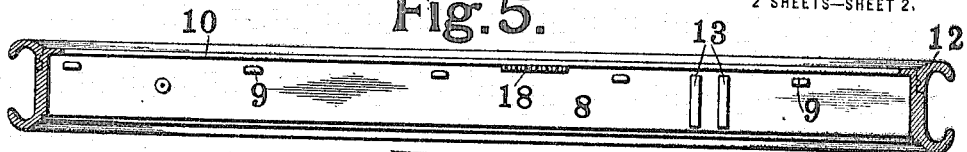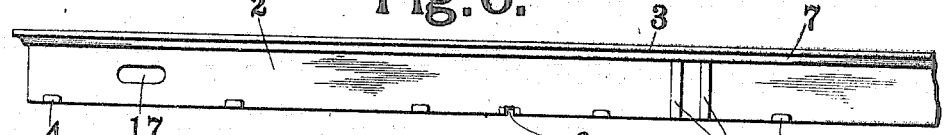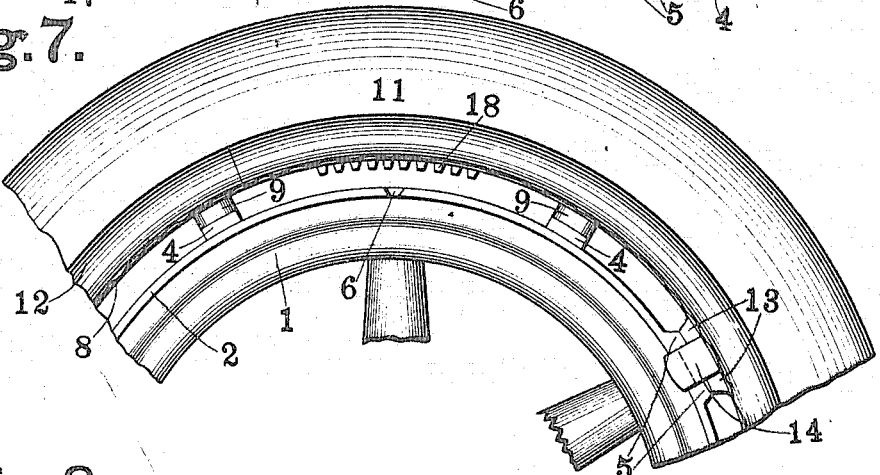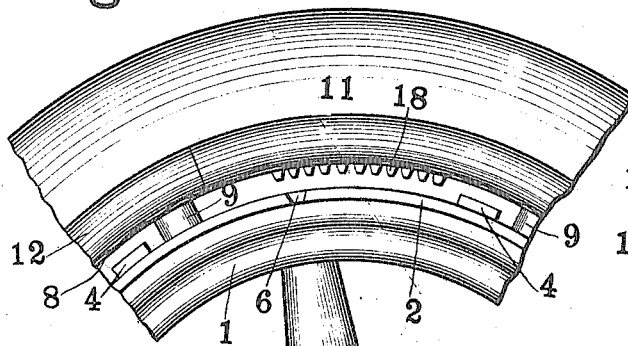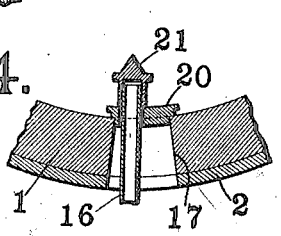

UNITED STATES PATENT OFFICE.

CHARLES D. MILLER, OF QUINCY, ILLINOIS, ASSIGNOR OF ONE-HALF TO SEWARD BEST, OF ADAMS COUNTY, ILLINOIS.

WHEEL.

1,145,842.  Specification of Letters Patent.  Patented July 6, 1915.

Application filed February 2, 1914. Serial No. 815,884.

*To all whom it may concern:*

Be it known that I, CHARLES D. MILLER, a citizen of the United States of America, residing at the city of Quincy, county of Adams, State of Illinois, have invented a certain new and useful Wheel, of which the following is such a full, clear, and exact description as will enable any one skilled in the art to which it appertains to make and use the same, reference being had to the accompanying drawings, forming part of this specification.

This invention relates to the class of wheels provided with demountable rims whereby a damaged tire can be readily removed from the wheel and a good tire substituted.

The object of the invention is to provide a wheel of this class which shall have a minimum number of parts, be extremely simple in construction, and in which the rim can be easily and quickly applied to and removed from the felly.

In many of the forms of wheels now in use, wedging surfaces, either as a part of the rim and felly, or on separate members coöperating therewith, are required to position and lock the parts together. This construction is objectionable in that even when such surfaces are true and clean, it is a difficult and tedious matter to bring them into proper relative position, and when out of shape or rusty, the difficulty is increased, and it is a further object of my invention to so construct and combine the parts that my improved wheel will be rigid and dependable in its assembled condition without the use of any wedging members or wedging surfaces and without requiring numerous bolts or other removable fastening devices.

A still further object is to provide a form of construction for connecting the rim and felly which may be applied with little expense to many forms of wheels now in service.

The accompanying drawings illustrate one embodiment of my invention.

Figure 1 is a side elevation with a portion of the flange carried by the rim broken away; Fig. 2 is a side elevation, showing the opposite side of the wheel from that shown in Fig. 1; Fig. 3 is a side view of the rim and tire, a portion of the flange on the rim being broken away; Fig. 4 is a side view of the wheel with the rim removed. Figs. 5 and 6 are developed views of the inner periphery of the rim and the outer periphery of the felly band, respectively. Fig. 7 is a side view of a portion of the felly and rim, showing these parts in their locked position, the flange on the rim being broken away, and Fig. 8 is a view similar to Fig. 7, showing the rim and felly in unlocked position. Fig. 9 is a cross section through the rim and felly; Fig. 10, a perspective view of a portion of the rim and felly, showing the means for shifting the rim circumferentially on the felly. Fig. 11 illustrates a suitable rim shifting tool. Fig. 12 is a perspective view of the key which locks the rim and felly against relative circumferential movement. Fig. 13 is a perspective view showing the end of the key in place and means for fastening the same. Fig. 14 is a view of the valve stem and associated parts.

The felly 1, which is usually constructed of wood, is provided with a metal band 2 having an upturned flange 3 and spaced retaining lugs 4 which may be integral with or suitably attached to the band. The felly band is also provided with locking projections 5 and with a tool receiving opening 6. The lugs 4 are positioned near one side of the periphery of the felly band and, on the opposite side, the up-turned portion or flange is provided with a bearing surface or seat 7 for one side of the rim. The rim 8 is provided with spaced retaining lugs 9 which are positioned to coöperate with the lugs 4 on the felly band to prevent lateral movement of the rim on the felly in one direction. These lugs also bear upon the surface of the felly band and form supports for the rim. The coöperating bearing surfaces of these lugs and the felly band are cylindrical and have equal radii. The rim may also be provided with a depending flange 10 adapted to bear against the side of the felly or felly band and to wholly exclude dirt and foreign substances from the space between the felly and the rim. Any suitable means may be provided whereby the tire 11 may be easily removed from or applied to the rim. In the construction illustrated in the drawings, the rim has a removable flange 12 for this purpose. The inner periphery of the rim also carries locking projections 13 which register with the locking projections 5 on the felly band when the retaining lugs 4 and 9 are in engagement. The key 14 fits into the recess formed by the locking projections and prevents relative circumferential movement between the rim and the felly. This key is held in place by the set screw 15.

To apply the rim to the wheel, the valve stem 16 is inserted through the elongated opening 17 in the felly and the rim shifted to such position that the lugs 9 may pass the lugs 4 and is then pushed into place, bringing the rim against the flange 3 on the felly band and bringing the flange 10 on the rim against the felly band. The corners of the coöperating surfaces of the lugs 4 and 9 are slightly rounded and the coöperating surfaces of these lugs are parallel to the plane of the wheel so that the rim may be shifted on the felly band to bring the lugs 9 behind the lugs 4 without any wedging action. In order to shift the rim on the wheel to bring the lugs into and out of opposing position, I provide a narrow opening 6 in the felly band and suitable teeth or depressions 18 on the body or flange of the rim, these projections 18 being serially positioned and adjacent to the opening 6. A suitable tool, such as shown in Fig. 11, may be inserted into the opening 6 and behind a projection 18, the edge of the opening 6 serving as a fulcrum by means of which the rim can be shifted until the locking projections 5 and 13 are brought into register and the retaining lugs 4 and 9 into opposing position. The removable plate 20 having an opening to receive the valve stem, and held in position by the valve cap 21, fits into and covers the opening 17 to exclude dust (see Fig. 14).

It will be observed that my improved wheel is of very simple construction, there being no removable parts except the key. The bearing surfaces between the rim, supporting lugs and the felly band, and between the retaining lugs are of relatively small area and are not wedged together and it is, therefore, possible to easily shift the rim into and out of locking position. The flanges on the rim and felly band prevent the space between these parts becoming clogged with mud or dust. It will also be apparent that the retaining and locking arrangement described can be applied to many forms of wheels now in use by providing the rims and fellies with the locking lugs properly positioned.

Having fully described my invention, what I claim as new and desire to secure by Letters-Patent of the United States is:

1. A wheel comprising a felly band provided with a circumferential flange, affording a circumferential bearing surface at one side of its periphery and with spaced retaining lugs adjacent to the opposite side, a removable rim provided with a circumferential bearing surface at one side of its inner periphery adapted to coöperate with the circumferential bearing surface of the felly band to support the rim and to prevent lateral motion thereof in one direction and with spaced lugs adjacent to the other side of its inner periphery and adapted to bear upon the surface of the felly band, said last named lugs being spaced to oppose the lugs on the felly band to prevent lateral movement of the rim in one direction, and a locking member coöperating with the felly and rim to prevent circumferential movement of the rim on the felly band.

2. In combination, a wheel, a removable rim carried thereby, said wheel being provided at one side of its periphery with a circumferential flange adapted to form a support for one side of the rim and prevent lateral motion thereof in one direction and with spaced retaining lugs adjacent to the other side, said rim being provided with a circumferential flange adapted to bear against the side of the wheel and with spaced retaining members on its periphery bearing upon the surface of the wheel to form supports for the rim and positioned to coöperate with the retaining members on the wheel to prevent lateral movement of the rim in one direction, the opposing surfaces of the retaining members being parallel to the plane of the wheel.

3. In combination, a wheel, a removable rim carried thereby, said wheel being provided at one side of its periphery with a circumferential flange adapted to bear against the rim and with spaced retaining members adjacent to the other side, said rim being provided with a circumferential flange adapted to bear against the side of the wheel and with spaced retaining members on its inner periphery bearing upon the surface of the wheel to form supports for the rim and positioned to coöperate with the retaining members on the wheel to prevent lateral movement of the rim in one direction, the opposing surfaces of said retaining members being parallel to the plane of the wheel, and the coöperating supporting surfaces of the wheel and the retaining members on the rim being cylindrical and of equal radii, a tool receiving opening in the felly band, and serially positioned projections carried on the rim adjacent to said opening.

In testimony whereof, I have hereunto set my hand and affixed my seal in the presence of the two subscribing witnesses.

CHARLES D. MILLER. [L. S.]

Witnesses:
  SEWARD BEST,
  FLORENCE E. MILLER.